United States Patent
Yamada

(10) Patent No.: US 7,252,241 B2
(45) Date of Patent: Aug. 7, 2007

(54) DATA COMMUNICATION SYSTEM, DATA COMMUNICATION DEVICE, CONTACTLESS COMMUNICATION MEDIUM, AND COMMUNICATION DEVICE CONTROL PROGRAM

(75) Inventor: Hideaki Yamada, Suwa (JP)

(73) Assignee: Seiko Epson Corporation (JP)

( * ) Notice: Subject to any disclaimer, the term of this patent is extended or adjusted under 35 U.S.C. 154(b) by 61 days.

(21) Appl. No.: 11/058,526

(22) Filed: Feb. 15, 2005

(65) Prior Publication Data

US 2005/0178836 A1 Aug. 18, 2005

(30) Foreign Application Priority Data

Feb. 16, 2004 (JP) .............................. 2004-038464

(51) Int. Cl.
*G06K 19/06* (2006.01)
(52) U.S. Cl. .................................................. 235/492
(58) Field of Classification Search ............... 235/492, 235/439, 451; 340/10.2, 572.1, 870.31; 342/42
See application file for complete search history.

(56) References Cited

U.S. PATENT DOCUMENTS

| | | | | |
|---|---|---|---|---|
| 5,345,231 A | * | 9/1994 | Koo et al. ............ | 340/870.31 |
| 5,874,725 A | * | 2/1999 | Yamaguchi ............ | 235/492 |
| 6,088,741 A | | 7/2000 | Murata ............ | 710/20 |
| 6,747,548 B1 | * | 6/2004 | Yamaguchi ............ | 340/10.51 |
| 6,960,985 B2 | * | 11/2005 | Wuidart ............ | 340/10.34 |

FOREIGN PATENT DOCUMENTS

| JP | 06-096300 | 4/1994 |
|---|---|---|
| JP | 08-162997 | 6/1996 |

OTHER PUBLICATIONS

RFID Handbook (Japanese Edition)(Second Edition), (pp. 176-180; Sections 9.2.2.1 and 9.2.2.2) and English translation.
RFID Handbook (Japanese Edition), Klaus Finkenzeller, translated by Software Engineering Laboratory co. Ltd and published by the Nikkan Kogyo Shimbun, Ltd.

* cited by examiner

*Primary Examiner*—Thien M. Le
*Assistant Examiner*—April Taylor
(74) *Attorney, Agent, or Firm*—Harness, Dickey & Pierce, P.L.C.

(57) ABSTRACT

A radio frequency identification system is provided having a data communication device and a contactless identification tag. The data communication device has an antenna coil, a first data receiving unit, a first data transmitting unit, a first data control unit, and a first data storing unit. Further, the contactless identification tag has an antenna coil, a second data receiving unit, a second data transmitting unit, a second data control unit, a second data storing unit, and a driving power generating unit. The first data control unit generates negative logic digital signals of transmission data. The first data transmitting unit modulates the digital signals and transmits the modulated signals.

7 Claims, 5 Drawing Sheets

MODULATION DEGREE OF 30 PERCENT (a)

(b)

MODULATION DEGREE OF 50 PERCENT (c)

(d)

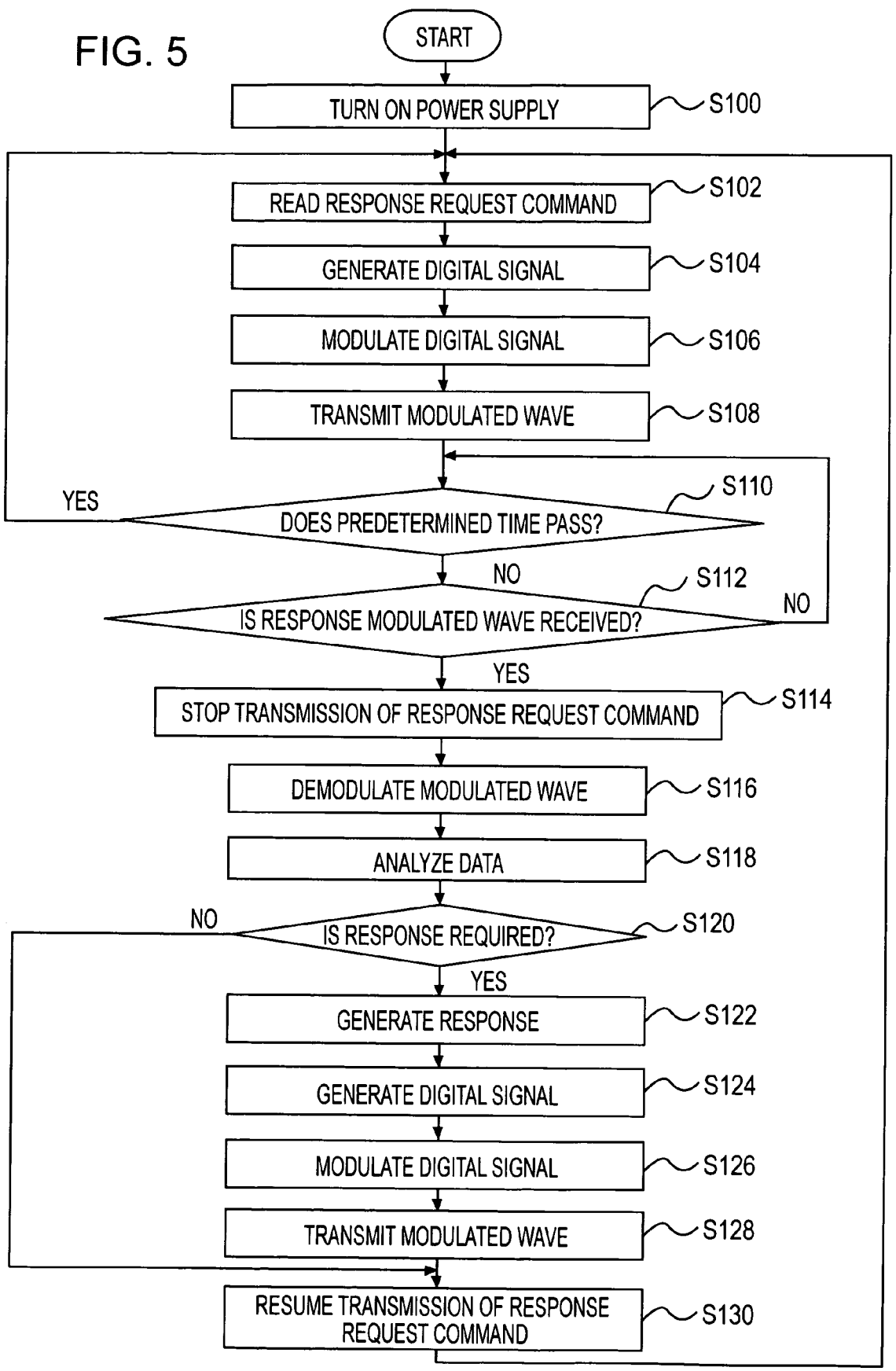

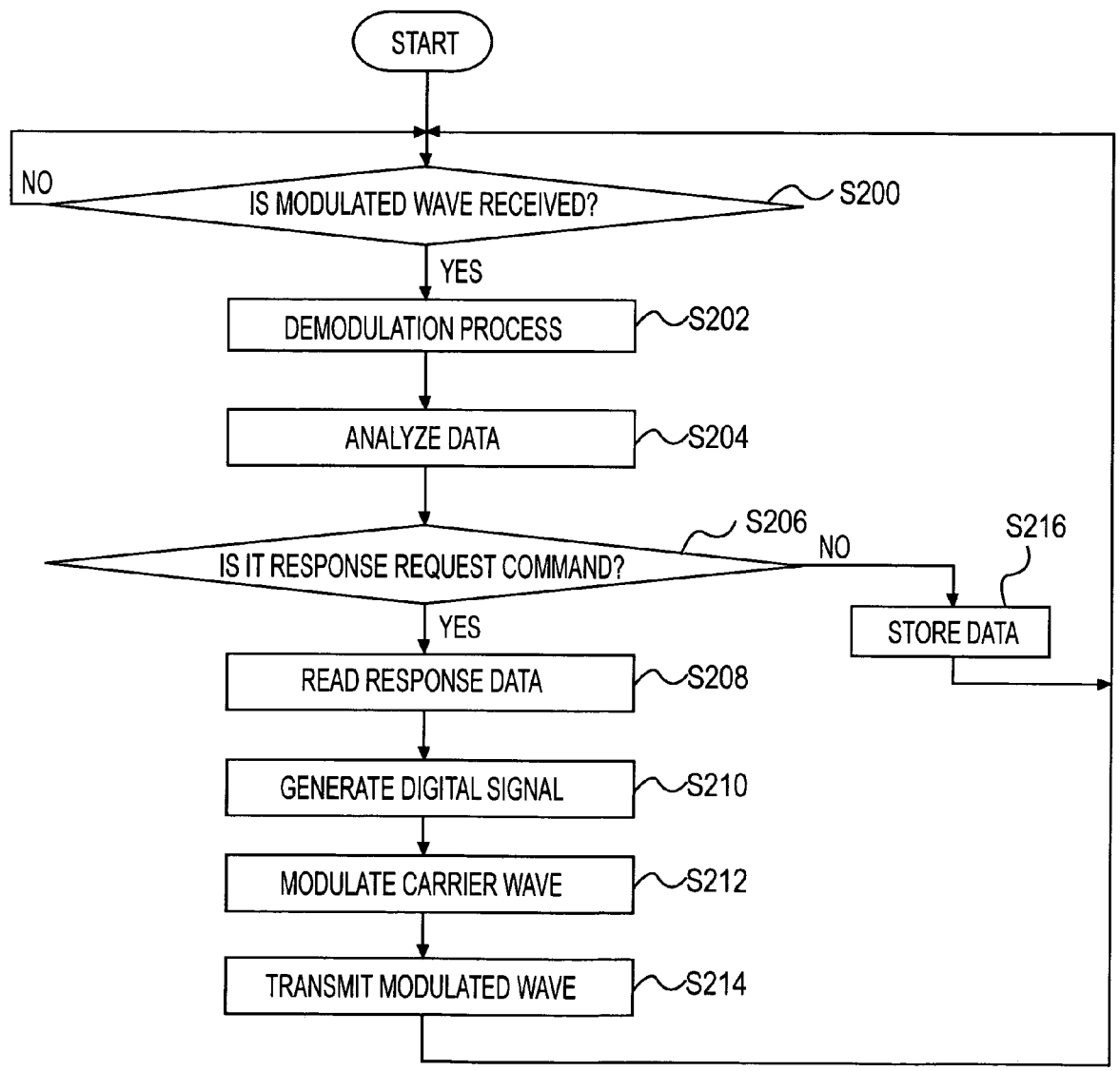

DATA COMMUNICATION SYSTEM, DATA COMMUNICATION DEVICE, CONTACTLESS COMMUNICATION MEDIUM, AND COMMUNICATION DEVICE CONTROL PROGRAM

RELATED APPLICATIONS

This application claims priority to Japanese Patent Application No. 2004-038464 filed Feb. 16, 2004 which is hereby expressly incorporated by reference herein in its entirety.

BACKGROUND

1. Technical Field

The present invention relates to data communications with a contactless communication medium, and more specifically, it relates to a data communication system, which is suitable for increasing power supply efficiency depending on modulated waves from a data communication device and for precisely demodulating modulated waves received by a contactless communication medium at the beginning, the data communication device, and the contactless communication medium.

2. Related Art

Conventionally, as a system in which data transmission and reception between an electronic data carrier and a data communication device, such as a reader or a reader/writer, are performed in a contactless manner, an RFID (radio frequency identification) system is known. In the RFID system, a technique in which the data communication device transmits power for driving the data carrier, together with data, in the contactless manner is known.

In such an RFID system, as a data communication method from the data communication device to the data carrier, two types of Type A and Type B are representatively known. The Type A data communication method is one in which power supply and data transmission are performed through modulated waves which are generated by means of modulation techniques of so-called 100 percent ASK (amplitude shift keying) modulation techniques. The 100 percent ASK modulation techniques associate combinations of modulated waves (modulated waves themselves) on the basis of 0 percent as a modulation degree and modulated waves (no modulated wave) on the basis of 100 percent as the modulation degree with 'logic 0' and 'logic 1' referred to as pause of digital data to be transmitted.

On the other hand, the Type B data communication method is one in which power supply and data transmission are performed through modulated waves which are generated by means of modulation techniques of so-called 10 percent (actually, in the range of from 8 percent to 14 percent) ASK modulation techniques. The 10 percent ASK modulation techniques associate modulated waves (modulated waves themselves) on the basis of 0 percent as the modulation degree and modulated waves on the basis of 10 percent as the modulation degree with 'logic 0' and 'logic 1' of digital data to be transmitted. Specifically, the modulated waves on the basis of 0 percent as the modulation degree are associated with 'logic 0' and the modulated waves on the basis of 10 percent as the modulation degree are associated with 'logic 1'.

Moreover, the above-mentioned RFID system is described in detail in RFID Handbook (Japanese Edition), Klaus Finkenzeller, translated by Software Engineering Laboratory Co. Ltd. and published by The Nikkan Kogyo Shimbun, Ltd.

In the Type B data transmission method, however, digital signals generated by a positive logic with respect to transmission data are modulated and transmitted to a data carrier corresponding to the B type data transmission method. Thus, when the data carrier of the Type B performs a demodulation process of modulated waves which are received immediately after the data communication device enters a communication domain, it is apprehended that, in a period until a driving power of a circuit is stabilized after the modulated waves are received, amplitude levels of waveforms of demodulated data signals are not sufficient and thus the waveforms may be corrupted. This is because a digital signal of 'logic 0' as a start bit of transmission data is modulated and transmitted in the Type B data communication method.

Accordingly, the present invention has been made in consideration of the unsettled problems in the prior art, and it is an object of the present invention to provide a data communication system which is suitable for increasing power supply efficiency depending on modulated waves from a data communication device and for precisely demodulating modulated waves received by a contactless communication medium at the beginning, the data communication device, and the contactless communication medium.

SUMMARY

In order to achieve the above-mentioned objects, there is provided a data communication system according to a first aspect of the present invention which comprises a data communication device and a contactless communication medium and performs wireless data communications between the data communication device and the contactless communication medium. The data communication device comprises negative logic signal generating means for generating negative logic digital signals based on transmission data, data transmission wave generating means for generating data transmission waves by modulating carrier waves based on the generated digital signals, and data transmission wave transmitting means for transmitting the data transmission waves. Further, the contactless communication medium comprises data transmission wave receiving means for receiving the data transmission waves, driving power generating means for generating a driving power from the data transmission waves, and data transmission wave demodulating means for demodulating the received data transmission waves.

According to such a configuration, the data communication device can generate the negative logic digital signals based on transmission data by means of the negative logic generating means, modulate the carrier waves based on the generated digital signals to generate the data transmission waves by means of the data transmission wave generating means, and transmit the data transmission waves by means of the data transmission wave transmitting means.

Further, the contactless communication medium can receive the data transmission waves by means of the data transmission wave receiving means, generate the driving power from the data transmission waves by means of the driving power generating means, and demodulate the received data transmission waves by means of the data transmission wave demodulating means.

Therefore, in the data communication device, transmission data is generated as the negative logic digital signals and the carrier waves are modulated with the negative logic digital signals. For example, when the present invention is applied to a system in which the logic 0 is continued as start bits of data, power supply efficiency to the contactless communication medium at the beginning can be enhanced, and thus the modulated waves received by the contactless communication medium at the beginning can be precisely demodulated.

Here, the contactless communication mediums are mediums which perform data communications with the data communication device in a contactless manner, like contactless identification tags in the RFID system. The contactless identification tags are generally called data carriers. As the shapes of the contactless identification tags, labels, cards, coins, or sticks are known. These shapes have a close relation to applications. For example, as one which a person carries, a key holder-shaped contactless identification tag which is obtained by treating the card or the label is used. Further, as a carrier ID of a semiconductor, the stick is widely used. Moreover, as one which is tacked to a linen cloth, the coin is widely used.

Further, the contactless identification tag has a data read only or data readable/writable storage region. In addition, the contactless identification tag can operate through contactless power transfer from the antenna even when a battery is not present.

Further, the RFID system is an ID system which uses an electric wave/electromagnetic wave as a medium. Here, the contactless identification tag has three features that (1) it has a portable size, (2) information is stored in an electronic circuit, and (3) communications are performed in a contactless manner.

Therefore, the RFID system is used to unify information to a person, an article, a vehicle or the like which carries the contactless identification tag. That is, the RFID system can extract needful information at any time at a location where the person, the article, the vehicle or the like is present and, if necessary, write new information.

Further, as representatives for the RFID system, there are widely known four systems of an electromagnetic coupling system in which the communications with the contactless identification tags are performed with the mutual induction of coils by means of an alternating current (AC) magnetic field, an electromagnetic induction system in which the communications with the contactless identification tags are performed with electromagnetic waves of 250 kHz or less, or electromagnetic waves of long and medium frequency wave band of 13.56 MHz band, a micro wave system in which data communications are performed between the antenna of the reader/writer and the contactless identification tags by means of micro waves of 2.45 GHz band, and an optical system in which LEDs as light sources, photo transistors as optical receivers, and so on are arranged and the communications with the contactless identification tags are performed with spatial transmission of light.

Further, as access systems, there are widely known four systems of a single-access mode, a FIFO (First In First Out) access mode, a multi-access mode, and a selecting access mode.

In the single-access mode, one contactless identification tag is present in an antenna communication domain. Here, if plural contactless identification tags are present in the antenna communication domain, a communication error occurs, such that the communication can not be performed.

In the FIFO access mode, the communications with the contactless identification tags which sequentially enter the antenna communication domain can be sequentially performed. An access prohibition process is performed to the contactless identification tag which ended the communication. Thus, even though plural tags which ended the communication are present in the antenna communication domain, only one new tag which enters the antenna communication domain can communicate with the data communication device. If the contactless identification tags simultaneously enter the communication domain, the communication error occurs and thus the communication can not be performed. The access-prohibited contactless identification tag will be in a state where it can communicate again, if it comes out outside the communication domain.

In the multi-access mode, even when plural contactless identification tags are present in the antenna communication domain, the device communication device can communicate with all the contactless identification tags.

In the selecting access mode, the data communication device can communicate with a specific contactless identification tag among plural contactless identification tags which are present in the communication domain. This is implemented with a command for allocating numbers to the contactless identification tags in the communication domain and a command for communicating with the specific contactless identification tag based on the allocated number.

In addition, in a data communication system of a second aspect according to the first aspect, the data transmission wave generating means performs an amplitude modulation which associates the carrier waves having two different amplitude levels with waveforms of logic 0 and logic 1 in the digital signals.

According to such a configuration, the amplitude modulation which associates the carrier waves having two different amplitude levels with the waveforms of logic 0 and logic 1 in the digital signals can be performed by means of the data transmission wave generating means.

Therefore, a high level carrier wave and a low level carrier wave are associated with the waveforms of logic 0 (because of the negative logic, corresponding to a high level digital waveform) and logic 1, respectively. Thus, when the present invention is applied to the system in which the logic 0 is continued as start bits of transmission data, power supply efficiency to the contactless communication medium at the beginning can be increased. As a result, the modulated waves received by the contactless communication medium at the beginning can be precisely demodulated.

In addition, in a data communication system of a third aspect according to the first aspect or second aspect, the data communication device further comprises response data transmission wave receiving means for receiving response data transmission waves which are transmitted from the contactless communication medium, and response data transmission wave demodulating means for demodulating the received response data transmission waves. Further, the contactless communication medium further comprises data storing means for storing predetermined data, response signal generating means for generating a response signal based on the demodulation result of the data transmission wave demodulating means and the stored content of the data storing means, response data transmission wave generating means for generating response data transmission waves by modulating the carrier waves based on the response signal, and response data transmission wave transmitting means for transmitting the response data transmission waves.

According to such a configuration, the data communication device can receive the response data transmission waves transmitted from the contactless communication medium by means of the response data transmission wave receiving means and demodulate the received response data transmission waves by means of the response data transmission wave demodulating means.

Further, the contactless communication medium can store predetermined data by means of the data storing means, generate the response signal based on the demodulation result of the data transmission wave demodulating means and the stored content of the data storing means by means of the response signal generating means, modulate the carrier waves with the response signal to generate response data transmission waves by means of the response data transmission wave generating means, and transmit the response data transmission waves by means of the response data transmission wave transmitting means.

Therefore, data transmission and reception can be performed between the data communication device and the contactless communication medium. In addition, since the contactless communication medium has the data storing means, the present invention can be easily applied to the RFID system or the like.

In addition, in a data communication system of a fourth aspect according to any one of first to third aspects, the contactless communication medium further comprises identification information storing means for storing unique identification information.

According to such a configuration, even when plural contactless communication mediums are present in the communication domain of the data communication device, the data communication device can easily select a communication partner by identification information of the contactless communication medium. Further, the present invention can be easily applied to the RFID system.

On the other hand, in order to achieve the above-mentioned objects, there is provided a data communication device according to a fifth aspect, which is applicable to the data communication system of the first aspect. The data communication device comprises negative logic signal generating means for generating negative logic digital signals based on transmission data, data transmission wave generating means for generating data transmission waves by modulating carrier waves based on the generated digital signals, and data transmission wave transmitting means for transmitting the data transmission waves.

Here, the present invention relates to the data communication device which is applicable to the first aspect, and advantages are the same as those in the first aspect and thus the descriptions will be omitted.

In addition, in a data communication device of a sixth aspect according to the fifth aspect, the data transmission wave generating means performs an amplitude modulation which associates the carrier waves having two different amplitude levels with waveforms of logic 0 and logic 1 in the digital signals.

Here, the present invention relates to the data communication device which is applicable to the second aspect, and advantages are the same as those in the second aspect and thus the descriptions will be omitted.

In addition, a data communication device of a seventh aspect according to the fifth or sixth aspect further comprises response data transmission wave receiving means for receiving response data transmission waves which are transmitted from the contactless communication medium, response data transmission wave demodulating means for demodulating the received response data transmission waves, and processing means for performing a predetermined process based on the demodulation result.

Here, the present invention relates to the data communication device which is applicable to the third aspect, and advantages are the same as those in the third aspect and the descriptions will be omitted.

On the other hand, in order to achieve the above-mentioned objects, there is provided a contactless communication medium according to an eighth aspect, which is applicable to the data communication system of the first aspect. The contactless communication medium comprises data transmission wave receiving means for receiving data transmission waves, driving power generating means for generating a driving power from the data transmission waves, and data transmission wave demodulating means, which is driven with a falling edge of a signal as a trigger, for demodulating the received data transmission waves.

Here, the present invention relates to the contactless communication medium which is applicable to the first aspect, and advantages are the same as those in the first aspect and thus the descriptions will be omitted.

In addition, a contactless communication medium of a ninth aspect according to the eighth aspect further comprises data storing means for storing predetermined data, response signal generating means for generating a response signal based on the demodulation result of the data transmission wave demodulating means and the stored content of the data storing means, response data transmission wave generating means for generating response data transmission waves by modulating carrier waves based on the response signal, and response data transmission wave transmitting means for transmitting the response data transmission waves.

Here, the present invention relates to the contactless communication medium which is applicable to the third aspect, and advantages are the same as those in the third aspect and thus the descriptions will be omitted.

In addition, a contactless communication medium of a tenth aspect according to the ninth aspect further comprises identification information storing means for storing unique identification information.

Here, the present invention relates to the contactless communication medium which is applicable to the fourth aspect, and advantages are the same as those in the fourth aspect and thus the descriptions will be omitted.

On the other hand, in order to achieve the above-mentioned objects, a data communication device control program of an eleventh aspect executable in a computer for controlling the data communication device of the fifth aspect is provided. The data communication device control program makes the computer perform a negative logic signal generating step of generating negative logic digital signals based on transmission data, a data transmission wave generating step of generating data transmission waves by modulating carrier waves based on the digital signals, and a data transmission wave transmitting step of transmitting the data transmission waves.

Here, the present invention relates to the program which controls the data communication device of the fifth aspect, and advantages are the same as those in the fifth aspect and thus the descriptions will be omitted.

BRIEF DESCRIPTION OF THE DRAWINGS

FIG. 5 is a flowchart showing an operation process of the data communication device 2.

FIG. 6 is a flowchart showing an operation process of the contactless identification tag 3.

DETAILED DESCRIPTION

Hereinafter, an embodiment of the present invention will be described with reference to the drawings. FIGS. 1 to 6 are diagrams showing an embodiment of a RFID system which uses a data communication system according to the present invention.

Figure 1:
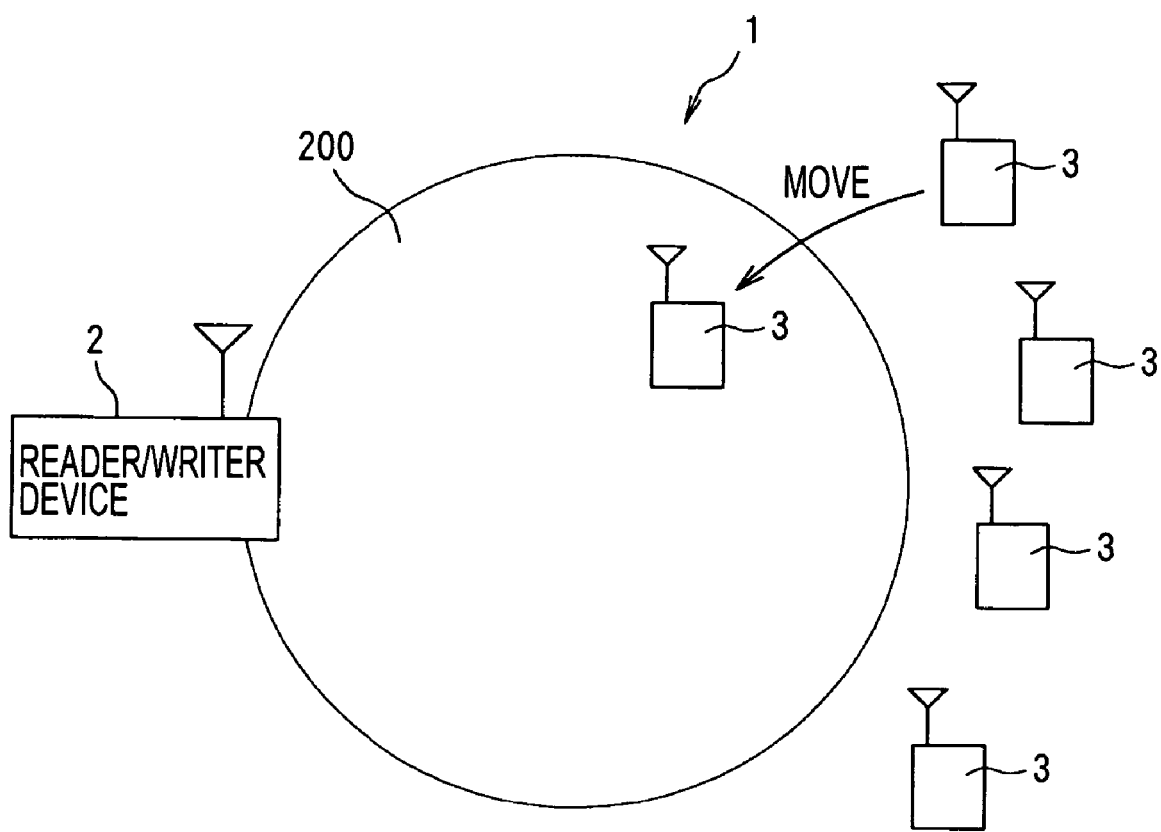
FIG. 1 is a diagram showing a schematic configuration of a RFID system 1 according to the present invention.

To begin with, a schematic configuration of a RFID system according to the present invention will be described with reference to FIG. 1. FIG. 1 is a diagram showing the schematic configuration of the RFID system 1 according to the present invention.

As shown in FIG. 1, the RFID system 1 has a data communication device 2 and plural contactless identification tags 3.

The data communication device 2 has a function of performing contactless communications with the contactless identification tag 3, which enters a communication domain 200 shown in FIG. 1, by means of electromagnetic inductive coupling. Thus, the data communication device 2 performs power supply to the contactless identification tag 3, in addition to data transmission and reception with the contactless identification tag 3. Further, at the time of data transmission, the data communication device 2 generates negative logic digital signals based on transmission data and modulates the digital signals using an amplitude modulation to transmit the modulated signals. The detailed configuration will be described later.

The contactless identification tag 3 has a function of receiving modulated waves, which are transmitted from the data communication device 2, and generating a driving power from the modulated waves. Further, the contactless identification tag 3 also has a function of driving its own functional units by the generated driving power and demodulating the received modulated waves. In addition, the contactless identification tag 3 has a function of generating a response signal based on transmission data, which is abstracted by demodulating the modulated waves, modulating the response signal, and transmitting the modulated signal. The detailed configuration will be described later.

Figure 2:
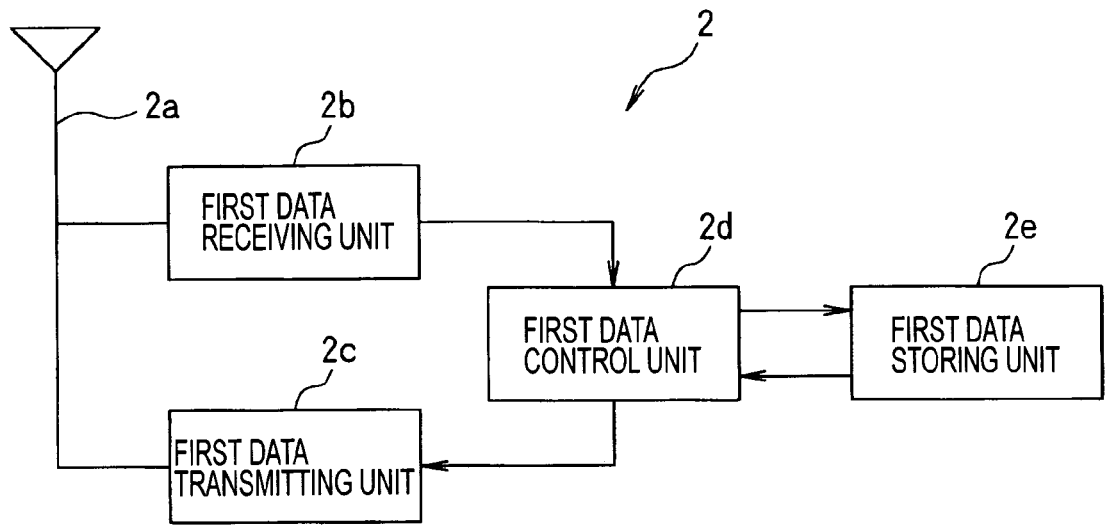
FIG. 2 is a block diagram showing a detailed configuration of a data communication device 2.

In addition, the detailed configuration of the data communication device 2 will be described with reference to FIG. 2. FIG. 2 is a block diagram showing the detailed configuration of the data communication device 2.

As shown in FIG. 2, the data communication device 2 has an antenna coil 2a, a first data receiving unit 2b, a first data transmitting unit 2c, a first data control unit 2d, and a first data storing unit 2e.

The antenna coil 2a is made of a spiral-shaped conductor and generates magnetic fluxes to cause the electromagnetic inductive coupling with an antenna coil 3a of the contactless identification tag 3 described later. Further, the antenna coil 2a performs the power supply and data communication with the contactless identification tag 3.

The first data receiving unit 2b has a function of demodulating modulated waves of response data which is received from the contactless identification tag 3 via the antenna coil 2a in the electromagnetic inductive coupling manner and a function of extracting response data from the modulated waves. Extracted response data is output to the first data control unit 2d.

The first data transmitting unit 2c has a function of modulating amplitudes of carrier waves based on the digital signals of transmission data according to control commands from the first data control unit 2d and a function of transmitting the modulated waves via the antenna coil 2a.

The first data control unit 2d has a function of giving the control commands concerning data transmission to the first data transmitting unit 2c and a function of generating the negative logic digital signals from transmission data (control commands of the contactless identification tag 3 or the like) which is read from the first data storing unit 2e. In addition, the first data control unit 2d has a function of storing received response data in the first data storing unit 2e and a function of reading transmission data with respect to received response data from the first data storing unit 2e to generate negative logic digital data. That is, the first data control unit 2d has a function of controlling a variety of data which is treated by the data communication device, such as data communication processes or various processes with respect to received data.

The first data storing unit 2e stores data required for the data communication device 2, that is, transmission data such as the control commands of the contactless identification tag 3, response data received from the contactless identification tag 3.

Here, the data communication device 2 has a storage medium in which a program for controlling the processes by the respective units is stored, a processor for executing the program, a RAM in which data required for executing the program is temporarily stored, and a bus which serves as a data transmission path for data transmission and reception between the respective units, all of which are not shown. And then, by allowing the processor to execute the control program stored in the storage medium, the processes between the respective units are performed. Moreover, the processes between the respective units are not limited to be performed by the control of the program. For example, the processes between the respective units may be implemented by means of a logic circuit.

Further, as the storage medium, a semiconductor storage medium such as RAM or ROM, a magnetic storable type storage medium such as FD or HD, an optical readable type storage medium such as CD, CDV, LD or DVD, or a magnetic storable/optical readable type storage medium such as MO may be used. Specifically, any storage medium may be used as long as it is a computer readable storage medium, irregardless of reading methods such as electronic, magnetic or optical method.

Figure 3:
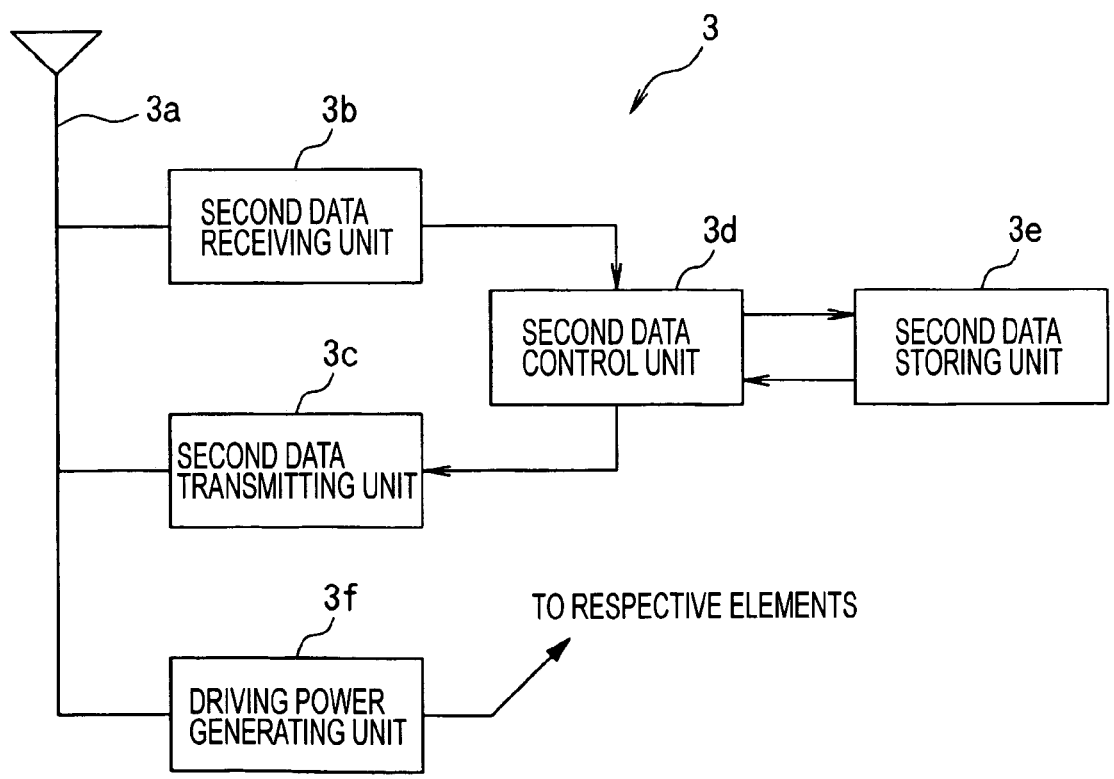
FIG. 3 is a block diagram showing a detailed configuration of a contactless identification tag 3.

In addition, the detailed configuration of the contactless identification tag 3 will be described with reference to FIG. 3. FIG. 3 is a block diagram showing the detailed configuration of the contactless identification tag 3.

As shown in FIG. 3, the contactless identification tag 3 has the antenna coil 3a, a second data receiving unit 3b, a second data transmitting unit 3c, a second data control unit 3d, a second data storing unit 3e, and a driving power generating unit 3f.

The antenna coil 3a is made of a spiral-shaped conductor and generates magnetic fluxes to perform transmission and reception of the modulated wave between the antenna coil 3a and the antenna coil 2a of the data communication device 2 by means of the electromagnetic inductive coupling.

The second data receiving unit 3b has a function of demodulating modulated waves of transmission data which is received from the data communication device 2 via the antenna coil 3a in the electromagnetic inductive coupling manner and a function of extracting transmission data from the modulated waves. Extracted transmission data is output to the second data control unit 3d.

The second data transmitting unit 3c has a function of modulating amplitudes of carrier waves based on the digital signals of the response data according to the control commands from the second data control unit 3d and transmitting the modulated wave via the antenna coil 3a.

The second data control unit 3d has a function of giving control commands concerning data transmission to the second data transmitting unit 3c, a function of storing received transmission data in the second data storing unit 3e, and a function of analyzing received transmission data to read response data with respect to transmission data from the first data storing unit 2e. That is, the second data control unit 3d has a function of controlling a variety of data which is treated by the contactless identification tag 3, such as the data transmission processes or various processes with respect to received data.

The second data storing unit 3e stores data required for the contactless identification tag 3, such as data (for example, positional information, time limit information, or amount information) according to a field to which the system is applied, received transmission data, a unique identification number, or the like. Here, in the present embodiment, a mask process is performed so as to prohibit writing into an area in which the unique identification number is stored.

The driving power generating means 3f rectifies and adjusts a current which is induced by the antenna coil 3a and then supplies a power generated by the current to the respective elements of the contactless identification tag 3. In the present embodiment, the contactless identification tag 3 does not have a power supply such as a battery, and thus it does not operate until the power generated by the driving power generating means 3f is supplied to the respective elements. Therefore, the contactless identification tag 3 is needed to supply the power from the modulated waves to itself, which are received just after it enters the communication domain 200, to start the respective elements.

Here, the contactless identification tag 3 has a storage medium in which a program for controlling processes of the respective units is stored, a processor for executing the program, a RAM in which data required for executing the program is temporarily stored, and a data transmission path for data transmission and reception between the respective units, all of which are not shown. And then, by allowing the processor to execute the control program stored in the storage medium, the processes between the respective units are performed. Moreover, the processes between the respective units are not limited to be performed by the control of the program. For example, the processes between the respective units may be implemented by means of a logic circuit.

Further, as the storage medium, a semiconductor storage medium such as RAM or ROM, a magnetic storable type storage medium such as FD or HD, an optical readable type storage medium such as CD, CDV, LD or DVD, or a magnetic storable/optical readable type storage medium such as MO may be used. Specifically, any storage medium may be used as long as it is a computer readable storage medium, irregardless of reading methods such as electronic, magnetic or optical method.

In addition, operations of the RFID system 1 will be specifically described. Here, an example in which the present system 1 is applied to automatic check and collection of a railway. That is, it is assumed that the data communication device 2 is incorporated into an automatic checking and collecting machine and the contactless identification tag 3 is incorporated into a commutation ticket or a prepaid card.

To being with, the data communication device 2 transmits a response request command to the contactless identification tag 3 in a predetermined period. According to the flow of the transmission process, first, the first data control unit 2d reads the response request command from the first data storing unit 2e and generates the negative logic digital signals from the read response request command. Here, it is assumed that the response request command is represented with binary numbers of four digits such as '0001'. In this case, as regards the negative logic digital signals, a high voltage level waveform of the digital signal is associated with 0 of the binary number and a low voltage level waveform of the digital signal is associated with 1 of the binary number. Thus, the response request command is made of three high voltage level waveforms and one low voltage level waveform of the digital signal. However, the start bit '0' or the like is actually added to the response request command. The digital signal generated in such a manner is sent to the first data transmitting unit 2c, together with the control command.

Next, the first data transmitting unit 2c modulates the amplitudes of the digital signals from the first data control unit 2d. In the present embodiment, the amplitude modulation is performed such that high level waveforms of the carrier waves are associated with the high levels of the digital signals and low level waveforms of the carrier waves are associated with the low levels of the digital signals. For example, non-modulated waveforms of the carrier waves are associated with the high levels of the digital signals and 10 percent modulated waveforms of the carrier waves are associated with the low levels of the digital signals. The carrier waves modulated in such a manner are transmitted to the communication domain 200 via the antenna coil 2a.

On the other hand, if the contactless identification tag 3 enters the communication domain 200 to which the modulated waves including the response request command are transmitted in the predetermined period in such a manner, the antenna coil 3a receives the modulated waves. By the received modulated waves, a current is induced in the antenna coil 3a. The driving power generating means 3f rectifies and adjusts the current induced in the antenna coil 3a to generate the driving power and supplies the power to the respective elements of the contactless identification tag 3. After being supplied with the power, the respective elements start and begin operations. Here, in the present embodiment, since the data communication device 2 converts transmission data into the negative logic digital signals, the digital signals of the logic 0 becomes maximum level waveforms of the carrier waves. Therefore, the maximum current is deduced in the antenna coil 3a by means of the carrier wave corresponding to the start bit '0', thereby generating a large driving power.

In addition, the second data receiving unit 3b, which operates by the supply of the driving power, performs the demodulation process to the received modulated waves including the response request command, such that the response request command is extracted. The extracted response request command is transmitted to the second data control unit 3d which operates by the same driving power. The second data control unit 3d analyzes the content of the command. It can be seen from the analysis result that it is the response request command. Thus, response data with respect to the command is read from the second data storing unit 3e. And then, the digital signals are generated from read response data and the generated digital signals are transmitted to the second data transmitting unit 3c, together with the control command. Here, in the present embodiment, as response data with respect to the response request command, when the contactless identification tag 3 is incorporated into the commutation ticket, data about a unique identification number and an available period of the commutation ticket is read from the second data storing unit 3e, and then the digital signals of response data are generated. Further, when the contactless identification tag 3 is incorporated into the prepaid card, data about a unique identification number and a balance is read from the second data storing unit 3e, and then the digital signals of response data are generated. The second data transmitting unit 3c modulates the amplitudes of the carrier waves based on the digital signals of response data to generate the modulated waves and transmits the modulated waves via the antenna coil 3a.

On the other hand, when receiving the modulated waves including response data from the contactless identification tag 3 via the antenna coil 2a, the data communication device 2 demodulates the modulated waves by means of the first data receiving unit 2b to extract response data. Extracted response data is analyzed by means of the first data control unit 2d and then the process to the analysis result is performed. For example, when the available period of the commutation ticket is included in response data, it is determined whether or not the period is valid. If it is determined that the period is valid, a shutter, which is not shown, is opened such that a user is allowed to pass through the automatic checking and collecting machine. On the other hand, if the period is not valid, the shutter is closed and an alarm or the like is issued. Further, for example, when the balance of the prepaid card is included in response data, the fee for the initial section or the fee for the travel sections is subtracted from the balance. And then, subtracted amount information is added to a data write command which is read from the first data storing unit 2e, such that the negative logic digital signals are generated from data and transmitted to the first data transmitting unit 2c, together with the control command.

And then, similarly, the first data transmitting unit 2c modulates the amplitudes of the digital signals from the first data control unit 2d and transmits the modulated signals via the antenna coil 2a. Here, the contactless identification tag 3 has unique information, and thus the data transmission may be performed by designating the contactless identification tag 3 as a communication partner with unique information. Further, information about unique identification number and the process result is sent to an information terminal (not shown), which is connected via a network, for management. That is, in the present embodiment, the unique identification number and customer information are associated with each other.

In addition, when receiving the modulated waves including the write command and subtracted amount information from the data communication device 2 via the antenna coil 3a, similarly, the contactless identification tag 3 demodulates the received modulated waves by the second data receiving unit 3b and extracts the write command and subtracted amount information. The second data control unit 3d analyzes the extracted write command and subtracted amount information and overwrites subtracted amount information onto balance information stored in the second data storing unit 3e based on the analyzed result.

Here, the contactless identification tag 3 constantly generates the driving power from the received modulated waves in a series of transmission and reception processes by the driving power generating means 3f and supplies the driving power to the respective elements.

In addition, an example in which, in order to confirm enhancement of actual power supply efficiency at the beginning, a comparison of demodulated waves in the contactless identification tag between a system which is constructed by conventional data communication device and contactless identification tag and the RFID system 1 of the present invention is performed will be described with reference to FIG. 4. Here, referring to FIG. 4, (a) and (c), and (b) and (d) represent relationships between the waveforms and modulated waves of transmission data from the data communication device and the demodulated waves in the contactless identification tag when the modulation degrees of the carrier waves from the data communication device in the conventional system and the present system 1 are set to 30 percent and 50 percent respectively. Further, in the present example, two kinds of the modulated waves respectively on the basis of 30 percent and 50 percent as the modulation degree are demodulated by means of 30 percent and 50 percent amplitude shift keying modulation techniques so as to clarify the difference between the conventional art and the present invention.

Figure 4:
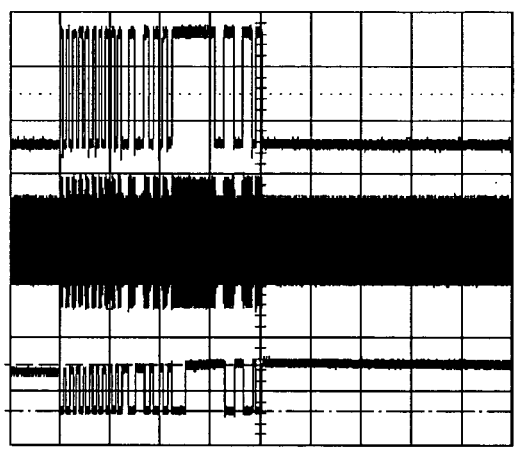
FIG. 4 is a diagram showing relationships between waveforms and modulated waves of transmission data from the, data communication device and demodulated waves in the contactless identification tag, when carrier waves from the data communication device are modulated on the basis of 30 percent and 50 percent as a modulation degree, in a conventional system ((a) and (c) in the drawing corresponds thereto) and the present system 1 ((b) and (d) in the drawing corresponds thereto).
Figure 4:
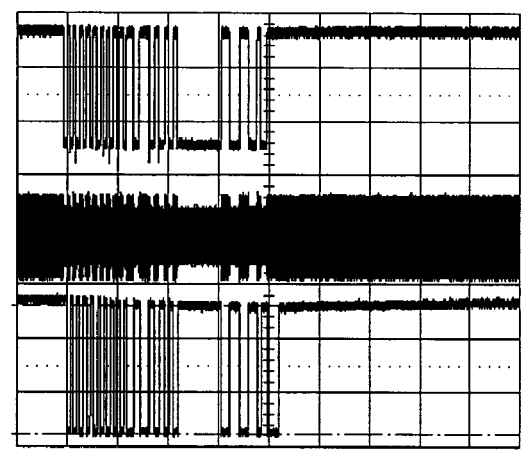
Figure 4:
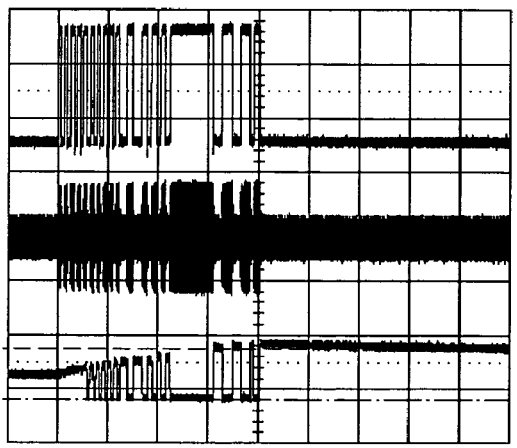
Figure 4:
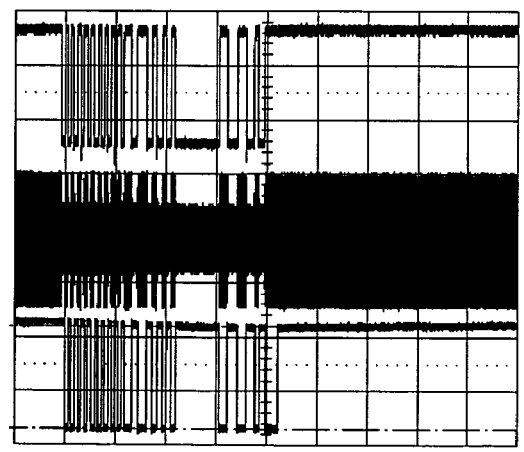

As shown in FIG. 4, with comparing the waveforms of transmission data in the conventional system to the waveforms of transmission data in the present system 1 on the basis of 30 percent and 50 percent as the modulation degree, it can be seen that logics are inverted in the conventional system and the present system 1. As described above, this is because transmission data is converted into the negative logic digital signals in the RFID system 1 of the present invention. The same can be applied to the modulated waves. That is, since the logics of the digital signals are inverted, the shapes of the modulated waves are symmetric.

In addition, the demodulated waves in the contactless identification tag of the conventional system and the present system 1 are compared to each other. As shown in (a) and (c) of FIG. 4, as for the waveforms of the demodulated waves in the conventional system, since the power supply is not sufficient at the beginning, amplitude levels of some initial waveforms are lowered and thus the waveforms of transmission data can not be accurately demodulated. In particular, as for the waveforms modulated by means of the 50 percent amplitude shift keying modulation technique, the waveforms are significantly corrupted, and thus it is apprehended that the logics of data may be erroneously recognized by the contactless identification tag. On the other hand, as shown in (b) and (d) of FIG. 4, as for the waveforms of the demodulated waves in the present system 1, the power supply at the beginning is sufficient. Thus, with the demodulated waves to the modulated waves by means of the 30 percent and 50 percent amplitude shift keying modulation techniques, the waveforms of transmission data can be sufficiently demodulated.

In addition, a flow of an operation process of the data communication device 2 in the RFID system 1 will be described with reference to FIG. 5. FIG. 5 is a flowchart showing the operation process of the data communication device 2.

As shown in FIG. 5, first, the process progresses to a step S100, and then a power supply is turned on, such that the power is supplied to the respective elements and the respective element operate. And then, the process progresses to a step S102.

At the step S102, the response request command is read from the first data storing unit 2e by means of the first data control unit 2d, and then the process progresses to a step S104.

At the step S104, the digital signals for transmission are generated from the read response request command by means of the first data control unit 2d, and then the process progresses to a step S106. Here, the digital signals for transmission are generated as the negative logic digital signals and transmitted to the first data transmitting unit 2c, together with the control command.

At the step S106, according to the control command from the first data control unit 2d, the carrier waves are modulated based on the digital signals for transmission by means of the first data transmitting unit 2c, and then the process progresses to a step S108.

At the step S108, the modulated waves, which are obtained by modulating the amplitude of the carrier waves, are transmitted via the antenna coil 2a by means of the first data transmitting unit 2c, and then the process progresses to a step S110.

At the step S110, it is determined by the first data control unit 2d whether or not a predetermined period passes. If it is determined that the predetermined period passes (Yes), the process progresses to the step S102. If not so (No), the process progresses to a step S112.

When the process progresses to the step S112, it is determined by the first data receiving unit 2b whether or not the modulated waves including response data from the contactless identification tag 3 are received. If it is determined that the modulated waves are received (Yes), the process progresses to a step S114. If not so (No), the process progresses to the step S110.

When the process progresses to the step S114, the transmission process of the response request command is stopped by means of the first data control unit 2d, and then the process progresses to a step S116.

At the step S116, the modulated waves received via the antenna coil 2a are demodulated by the first data receiving unit 2b to extract response data, and then the process progresses to a step S118.

At the step S118, extracted response data is analyzed by means of the first data control unit 2d, and then the process progresses to a step S120.

At the step S120, it is determined by the first data control unit 2d whether or not a response to response data is required based on the analysis result. If the response is required (Yes), the process progresses to a step S122. If not so (No), the process progresses to a step S130. Here, in the above-mentioned automatic checking and collecting machine, when the prepaid card is used, the response is required, while, when the commutation ticket is used, the response is not required.

When the process progresses to the step S122, by means of the first data control unit 2d, the write command is read from the first data storing unit 2e and response data is generated. And then, the process progresses to a step S124. Here, the generation of response data means that data in which subtracted amount information and the write command when the prepaid card is used are joined together is generated in the above-mentioned automatic checking and collecting machine.

At the step S124, the negative logic digital signals are generated based on generated data by means of the first data control unit 2d and transmitted to the first data transmitting unit 2c, together with the control command, and then the process progresses to a step S126.

At the step S126, the amplitudes of the digital signals including response data to the contactless identification tag 3 are modulated by means of the first data transmitting unit 2c, and then the process progresses to a step S128.

At the step S128, the generated modulated waves including response data to the contactless identification tag 3 are transmitted by the first data transmitting unit 2c via the antenna coil 2a.

At a step S130, the transmission process of the response request command during stopping is resumed by the first data control unit 2d, and then the process progresses to the step S102.

Moreover, in the above-mentioned flowchart, a series of processes, in which response request data is read, the negative logic digital signals are generated from data, the carrier waves are modulated based on the generated digital signals, and the modulated waves, from the step S102 to the step S108 are repetitively performed for every predetermined time. However, the present invention is not limited to this configuration. For example, once the digital signals are generated, they may be held and the modulation process of the carrier waves may be repetitively performed based on them.

In addition, a flow of an operation process of the contactless identification tag 3 in the RFID system 1 will be described with reference to FIG. 6. FIG. 6 is a flowchart showing the operation process of the contactless identification tag 3. Here, the flowchart of FIG. 6 shows the flow of the operation process after the driving power is generated and supplied to the respective elements by means of the driving power generating means 3f of the contactless identification tag 3.

As shown in FIG. 6, first, the process progresses to a step S200, and it is determined whether or not the modulated waves are received by the second data receiving unit 3b via the antenna coil 3a. If it is determined that the modulated waves are received (Yes), the process progresses to a step S202. If not so (No), the process waits until the modulated waves are received.

When the process progresses to the step S202, the modulated waves received via the antenna coil 3a are demodulated by means of the second data receiving unit 3b and transmission data is extracted. And then, the process progresses to a step S204.

At the step S204, the extracted transmission data is analyzed by means of the second data control unit 3d, and then the process progresses to a step S206.

At the step S206, it is determined by the second data control unit 3d whether or not extracted transmission data is the response request command, based on the analysis result. If it is determined that extracted transmission data is the response request command (Yes), the process progresses to a step S208. If not so (No), the process progresses to a step S216.

When the process progresses to the step S208, response data is read from the second data storing unit 3e, and then the process progresses to a step S210.

At the step S210, the digital signals are generated based on the read response data and transmitted to the second data transmitting unit 3c, together with the control command, by means of the second data control unit 3d. And then, the process progresses to a step S212.

At the step S212, according to the control command, the carrier waves are modulated based on the digital signals by means of the second data transmitting unit 3c and the modulated waves are generated. And then, the process progresses to a step S214.

At the step S214, the generated modulated waves are transmitted via the antenna coil 3a by means of the second data transmitting unit 3c, and then the process progresses to the step S200.

On the other hand, at the step S206, when it is determined that received transmission data is not the response request command and the process progresses to the step S216, received transmission data is stored in the second data storing unit 3e by means of the second data control unit 3d. And then, the process progresses to the step S200.

In such a manner, when generating the digital signals of transmission data, the data communication device 2 can generate the negative logic digital signals, modulate them, and transmit the modulated signals to the contactless identification tag 3. Thus, as described above, supply efficiency of the driving power in the contactless identification tag 3 can be enhanced.

Further, the contactless identification tag 3 can receive the modulated waves of the negative logic digital signals, which are transmitted from the data communication device 2, and generate the driving power from the modulated waves.

Further, the contactless identification tag 3 can receive the modulated waves of the negative logic digital signals, which are transmitted from the data communication device 2, demodulate them, and perform various processes using demodulated transmission data.

That is, the present system can shorten the starting time of each element in the contactless identification tag 3, and thus it can be efficiently applied to a system, like the automatic check and collection, in which data read and write operations are needed to be performed in a short time.

Here, the generation process of the negative logic digital signals in the first data control unit 2d shown in FIG. 2 corresponds to the negative logic signal generating means of the first or fifth aspect. The process of modulating the carrier waves based on the negative logic digital signals to generate the modulated waves in the first data transmitting unit 2c corresponds to the data transmission wave generating means of any one of the first, second, third, fifth, sixth, and ninth aspects. Further, the transmission process of the modulated waves via the antenna coil 2a by means of the first data transmitting unit 2c corresponds to the data transmission wave transmitting means of any one of the first, third, fifth, and ninth aspects. The reception process of the modulated waves from the contactless identification tag 3 by means of the antenna coil 2a and the first data receiving unit 2b corresponds to the response data transmission data receiving means of the third or sixth aspect. In addition, the demodulation process of the received modulated waves in the first data receiving unit 2b corresponds to the response data transmission wave demodulating means of the third or sixth aspect.

Further, the reception process of the modulated waves by means of the antenna coil 3a and the second data receiving unit 3b shown in FIG. 3 corresponds to the data transmission wave receiving means of any one of the first, third, seventh, and eighth aspects. The driving power generating unit 3f corresponds to the driving power generating means of the first or eighth aspect. The demodulation process of the modulated waves received in the second data receiving unit 3b corresponds to the data transmission wave demodulating means of any one of the first, third, sixth, eighth, and ninth aspects. Further, the second data storing unit 3e corresponds to the data storing means of any one of the third, eighth, and ninth aspects. The process of generating the digital signals of response data with respect to transmission data from the data communication device 2 in the second data control unit 3d and the second data storing unit 3e corresponds to the response signal generating means of the third or ninth aspect. In addition, the process of modulating the carrier waves based on the digital signals to generate the modulated waves in the second data transmitting unit 3c corresponds to the response data transmission wave generating means of the third or ninth aspect. The transmission process of the modulated waves by means of the second data transmitting unit 3c and the antenna coil 3a corresponds to the response data transmission wave transmitting means of the third or ninth aspect. The unique identification number stored in the second data storing unit 3e corresponds to unique identification information of the fourth or tenth aspect.

Moreover, in the above-mentioned embodiment, the example in which the present invention is applied to the automatic checking and collecting system of the railway is described. However, the present invention is not limited to this example. For example, the present system may be applied to various systems in which data read and write operations are performed in a contactless manner within the communication domain.

What is claimed is:

1. A data communication system comprising:
   a data communication device comprising:
      a first data control unit that generates negative logic digital signals based on transmission data; and
      a first data transmitting unit that generates a first carrier waves by modulating the negative logic digital signals and that transmits the first carrier waves; and
   a contactless communication medium that performs wireless data communications between the data communication device and the contactless communication medium,
   the data communication device transmits carrier waves having a first and a second amplitude level:
      the first amplitude level corresponds to logic 0; and
      the second amplitude level corresponds to logic 1, wherein the first amplitude level exceeds the second amplitude level.

2. The data communication system according to claim 1, wherein:
   the contactless communication medium includes:
      a second data receiving unit that receives the carrier waves and a second data transmitting unit that demodulates the received carrier waves; and
      a driving power generating unit that generates a driving power from the carrier waves.

3. The data communication system according to claim 1, wherein:
   the data communication device further includes:
      a first data receiving unit that receives response carrier waves transmitted from the contactless communication medium and that demodulates the received response carrier waves; and
   the contactless communication medium further includes:
      a second data storing unit that stores content, the content includes at least an identification information;
      a second data control unit that generates a response signal based on a result demodulated by the second data receiving unit and the stored content of the second data storing unit; and
      a second data transmitting unit that generates response carrier waves by modulating the response signal and that transmits the response carrier waves.

4. The data communication device according to claim 1, further comprising:

a first data receiving unit that receives response carrier waves transmitted from the contactless communication medium and that demodulates the received response carrier waves.

5. A contactless communication medium suitable for a data communication system as claimed in claim 1, the contactless communication medium comprising:
- a second data receiving unit that receives a first carrier waves and a first data receiving unit that demodulates a received response carrier waves; and
- a driving power generating unit that generates a driving power from the first carrier waves.

6. The contactless communication medium according to claim 5, further comprising:
- a second data storing unit that stores content, the content includes at least an identification information;
- a second data control unit that generates a response signal based on a result demodulated by the second data receiving unit and the stored content of the second data storing unit;
- a second data transmitting unit that generates the response carrier waves by modulating carrier waves based on the response signal and that transmits the response carrier waves.

7. A data communication device control program executable in a computer for controlling a data communication device according to claim 1 and to make the computer perform:
- a negative logic signal generating step of generating negative logic digital signals based on transmission data;
- a carrier wave generating step of generating carrier waves by modulating the negative logic digital signals; and
- a carrier wave transmitting step of transmitting the carrier waves.

* * * * *